(No Model.)

J. KLOTZ.
WHEEL.

No. 344,118. Patented June 22, 1886.

WITNESSES
Jas. H. Robins.
George W. Wissinburn

INVENTOR
Joseph Klotz
By his Attorneys
R.S. & A.P. Lacey

UNITED STATES PATENT OFFICE.

JOSEPH KLOTZ, OF PITTSTON, PENNSYLVANIA.

WHEEL.

SPECIFICATION forming part of Letters Patent No. 344,118, dated June 22, 1886.

Application filed July 8, 1885. Serial No. 170,982. (No model.)

*To all whom it may concern:*

Be it known that I, JOSEPH KLOTZ, a citizen of the United States, residing at Pittston, in the county of Luzerne and State of Pennsylvania, have invented certain new and useful Improvements in Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is an improvement in vehicle or pulley wheels, having for its object a construction whereby the spokes will be securely held in place without the use of lock-nuts or pins or rivets.

A further object of my invention is to produce a wheel which can be manufactured at a slight cost, and in which the parts will be easily renewable.

Figure 1:
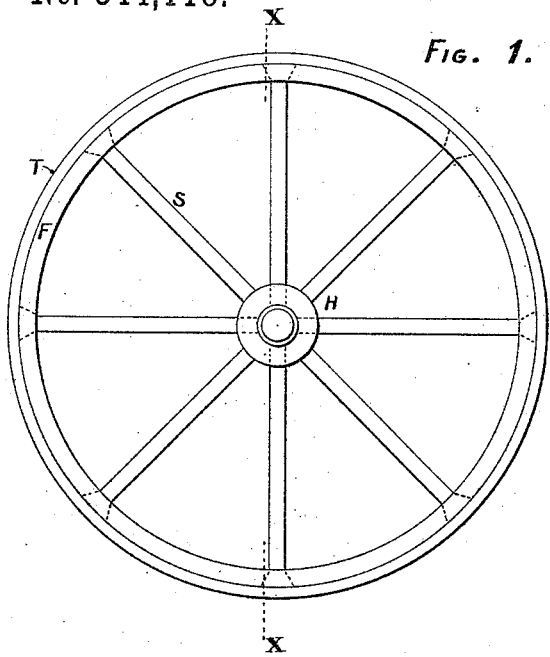
Figure 2:
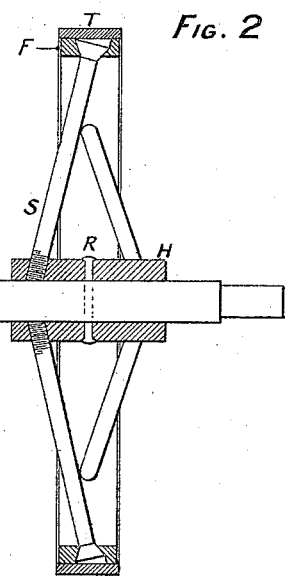
Figure 8:
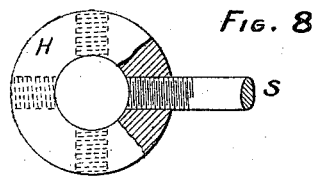

I attain these objects by the construction shown in the accompanying drawings, in which Figure 1 is a view of a wheel constructed according to my invention. Fig. 2 is a cross-section of the same on line X X, Fig. 1. Figs. 3, 4, 5, and 6 are partial cross-sections showing slightly-different forms of my device. Fig. 8 is an end view, partly in section, of the hub.

Figure 7:
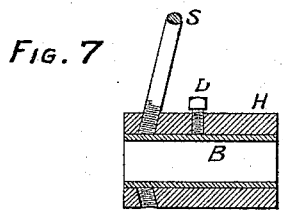

In all the figures except Fig. 7 I have shown a wheel adapted especially for wheelbarrows; but my improvements can be applied to any other wheel without departing from the principles of my invention. In Fig. 7 I have shown how it can be applied to a wheel adapted to turn on a stationary spindle.

In the drawings, H designates the hub, A the spindle or axle, S the spokes, F the wheel-felly, and T the tire, throughout all the views.

R, Fig. 2, indicates a rivet, pin, or bolt inserted through the hub and axle.

D, Fig. 7, is a set-screw, and B, same figure, is a metallic or other bushing, all of which will be hereinafter fully described.

Figure 3:
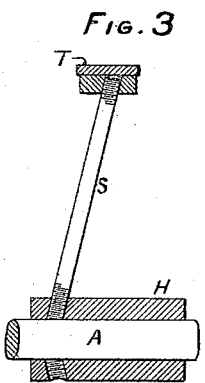
Figure 4:
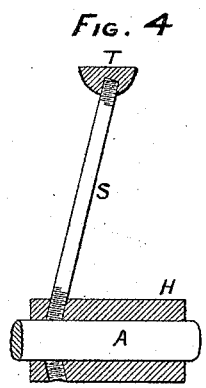
Figure 5:
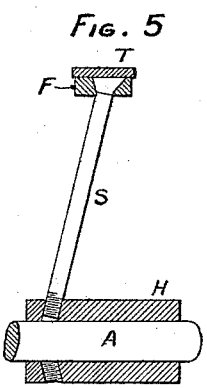
Figure 6:
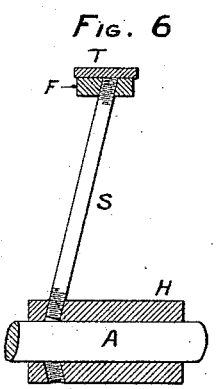

The hub H may be any suitable construction, although I have represented it as being simply a cylindrical block. Through the center of the hub, and transversely to its longest diameter, I form a slot for the reception of the pin R or screw D, hereinafter described. This slot may be extended through both sides or only one side of the hub, as may be desired. The spindle or axle A is provided with a slot, which is made to coincide with the slot in the hub, as shown in Fig. 2. The spokes S are staggered, and may be of any of the forms shown in the drawings. In all the figures I have shown the inner end of the spoke screwed into the hub. In Figs. 3 and 6 I have shown the outer end as screwed into the felly. In Fig. 4 I have shown the outer end as screwed into a heavy solid tire, the fellies being dispensed with. In Figs. 1, 2, and 5 I have shown the outer end of the spoke as provided with a conical head, which fits in a countersunk hole in the felly.

When my invention is applied as shown in Figs. 3, 4, and 8, the inner end of the spoke is screwed into the hub far enough to permit the outer end to be brought into position for entering the felly. It is then unscrewed until the outer end of the spoke has passed a proper distance into the felly or tire.

When the construction of spoke shown in Figs. 1, 2, and 5 is used, the spoke has to be inserted through the felly before its insertion in the hub, as will be readily understood. The spokes are made of such a length that a small portion of the inner end will project across the spindle-opening in the hub after the spoke has been secured in place. After all the spokes have been secured in the manner just described a drill or other cutter is run through the hub, cutting off the projecting ends of the spokes, and leaving an entirely open passage for the insertion of the spindle or bushing. This operation also forms a concavity in the end of the spoke at an angle to its pitch, which conforms to the convexity of spindle A or bushing B. It will be seen that when the bushing or spindle is inserted through the hub the spokes will be firmly locked by the engagement of the convexity and concavity just described.

Instead of locking the spokes by means of the spindle or bushing, as just described, they could be locked as shown in Figs. 5 and 6. In this construction the spokes are placed in the wheel, as before described, and their outer ends are left projecting beyond the felly. The projecting ends of the spokes are then shaved off, so that the outer circumference of the wheel presents an entirely smooth surface. This operation, it will be understood, forms a convex surface of the outer end of the spoke. When the tire is placed on the wheel, the inner circumference of the tire, being a concave surface, will firmly lock the spokes in the wheel, as will be understood.

By either of the constructions described the spokes will be prevented from unscrewing out of the wheel. I prefer, however, to use the construction first described, and shown in all of the figures but 5 and 6, as a broken spoke can thereby be much more easily replaced.

The bushing B is used when the wheel is applied to a stationary spindle.

Both the spindle A and bushing B are removable, and are held in place, respectively, by the pin, rivet, or bolt R and the set-screw D.

One or another of the forms of construction shown and described can be used, according to the size of the wheel and the character of the work it is to perform.

Having thus described my invention, what I claim, and desire to secure by Letters Patent, is—

1. A wheel consisting of a felly, a hub, a tire, and spokes having their inner ends screwed into the hub, and having their outer ends screwed into the felly or held therein by countersunk heads, and conforming to and abutting against the inner surface of the tire, whereby the tire operates to prevent the spokes from unscrewing, substantially as shown and specified.

2. A wheel consisting of a felly, a hub, a central spindle or bushing, and spokes having their outer ends screwed into the felly or held therein by countersunk heads, and having their inner ends screwed into the hub, and conforming to and abutting against the surface of the spindle or bushing, which operates to prevent the spokes from unscrewing, substantially as specified and shown.

In testimony whereof I affix my signature in presence of two witnesses.

JOSEPH KLOTZ.

Witnesses:
S. P. FENN,
F. H. KYTE.